Oct. 12, 1965 J. E. THOMPSON 3,211,559
PROCESS FOR DEHYDRATING MEAT
Filed Dec. 31, 1964
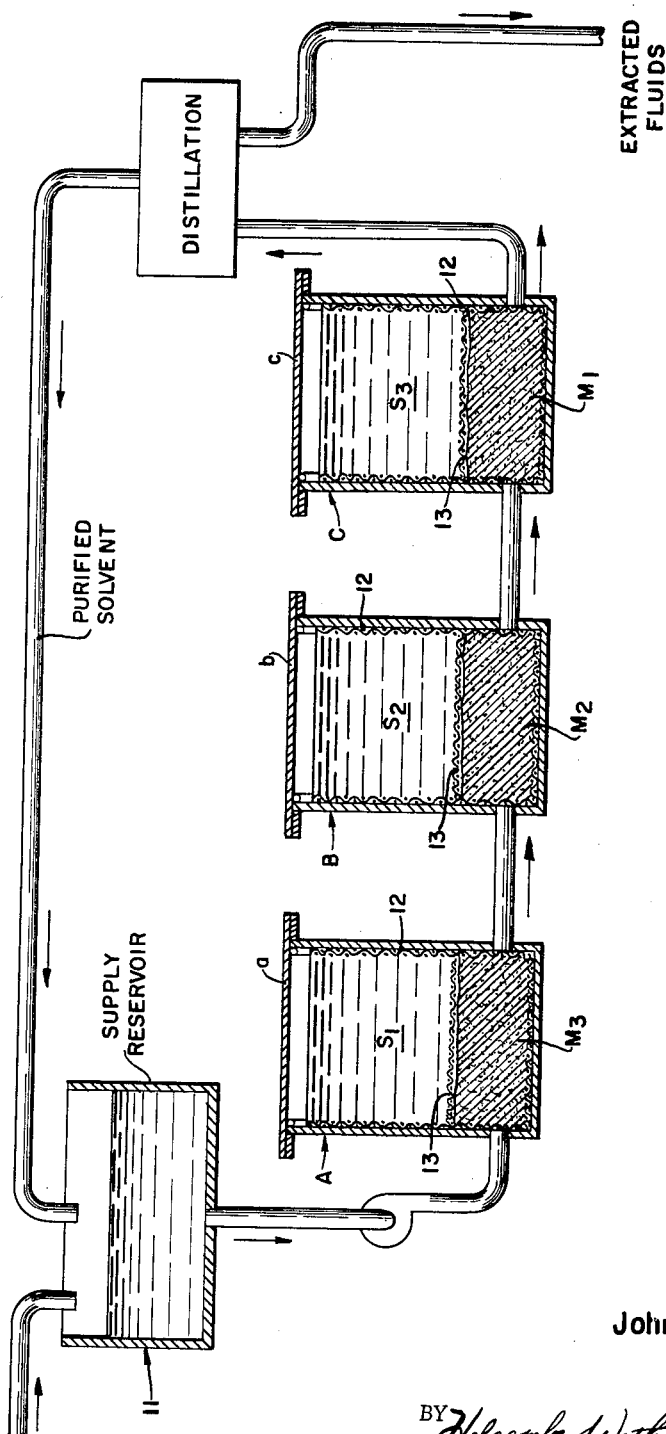
INVENTOR
John E. Thompson
BY Holcombe, Wetherill & Brisebois
ATTORNEYS

United States Patent Office 3,211,559
Patented Oct. 12, 1965

3,211,559
PROCESS FOR DEHYDRATING MEAT
John E. Thompson, 908 Burns Ave., Flossmoor, Ill.
Filed Dec. 31, 1964, Ser. No. 422,812
3 Claims. (Cl. 99—208)

The present invention, which is a continuation-in-part of prior application Serial No. 169,734, filed January 30, 1962, now abandoned, relates to the preparation of a dehydrated food product and more in particular to a process of effecting the dehydration of meat by means of a water solvent liquid, and to the products obtained thereby.

Processes for treating meat by solvent extraction methods have hitherto been proposed. In Patent No. 2,503,312, for example, there is described a method involving the heating of wet organic tissue in the presence of a fat solvent at a temperature and pressure at which the solvent will distill, recycling the distilled solvent, and ultimately separating the solvent from the defatted and dehydrated substance. In Patent No. 2,503,313 a comparable process is carried out on glandular materials by means of azeotropic distillation in the presence of a water insoluble organic compound. According to Patent No. 2,539,544 the combined drying and defatting of animal tissue may be effected by suspending the material in a water insoluble fat solvent under controlled conditions of pressure and temperature. In Patent No. 2,619,425, there is described a process for drying and defatting a biological substance involving azeotropic distillation of water from the material with the aid of a water immiscible fat solvent. Patent No. 2,813,027 relates to a method of treating fish material to remove the fishy odor and taste therefrom by extracting the material using alcohol with the aid of heat, a pH value of 8 or more being maintained by addition of aqueous alkali to the materials. Also in Patent No. 2,875,061 there is described a process for preparing edible protein from raw fish material using a heated solution of an alkali hydroxide in ethanol.

Processes such as the foregoing, involving the use of elevated temperatures and/or pressures can be carried out only by means of special apparatus, and require more or less constant attention or special automatic controls. Moreover, when meat proteins are heated to even moderately elevated temperatures for short periods of time they undergo changes in texture and flavor and become resistant to rehydration. These and other drawbacks encountered in prior solvent dehydration practices have hindered the introduction of these processes in plant operations.

The process according to the present invention, on the other hand, wherein the solvent dehydration is effected without heating and within the range of ordinary room temperature, can be carried out with substantially unspecialized apparatus. Losses of solvent in the process, due to evaporation, are held to a minimum. Further, the products obtained are readily hydrolyzable, and when reconstituted not only retain the desirable characteristic original flavor to a marked degree, but also exhibit satisfactory texture and consistency, or "mouth feel." Even particularly heat sensitive food materials can be treated successfully by the present process.

In the specific examples hereinafter described, it will be understood that insofar as the solvent extraction steps are concerned, these are carried out within the range of ordinary room temperature.

A primary object of the present invention is the production of a meat product useful for food purposes that is high in protein content.

A concurrent object is the production of an article of this type in dehydrated form, which may be reconstituted by the addition of water, and is accordingly well adapted to be incorporated in gravies, sauces, etc., and that constitutes a valuable food which is nutritious, palatable, and useful in ordinary or special diets.

A further object of the present invention is the provision of a stable meat product which is sufficiently freed from harmful bacteria and like agents, that the product has good keeping qualities.

It is further object of the present invention to provide a process for dehydrating meat that will be economical and not subject to other disadvantages inherent in heretofore proposed processes of meat dehydration.

By the term "meat" as herein employed, reference is had to all proteinaceous materials of animal origin commonly comprehended under that term, such as beef, pork, sausage, fowl, fish, shrimp and including not only table products but also those portions which while not commonly regarded as articles of human consumption contain valuable food factors, such as hog liver, glandular materials and the like.

The present invention relates to a process the operation of which is relatively simple, effective and economical, and which will yield a high protein meat product of desirable characteristics as to its keeping qualities, convenience in use, palatability and dietary value.

In accordance therewith, a normally liquid solvent is employed which has the capacity to absorb water from the meat tissues, and which readily may be separated from the processed meat material after treatment of the material therewith. This solvent is non-toxic or sufficiently non-toxic that any minute residues that may be retained in the dehydrated meat material can have no toxic effect when ingested into the human system, and further, exerts a specific antiseptic action on the meat material during processing thereof.

When ethanol is used as the liquid solvent it not only fulfills the foregoing condition but has the advantage of being selective with respect to the fat content of the meat material, in that it is not only a good dehydrating agent, but also, in sufficient concentrations has the capacity to dissolve fatty material. Accordingly, if it is desired to defat the meat, as well as dehydrate it, the water content of the ethanol should be a minimum, whereas if it is desired to dehydrate only, a higher water content should be present. The dissolved fat may be readily separated from the alcohol by addition of water. Likewise the degree of dehydration can be regulated by adjustment of the proportion of water in the ethanol, a concentrated solution acting as a strong dehydrating agent, and a weak aqueous solution of ethanol having a minimum dehydrating action or if sufficiently dilute, none at all.

Additionally ethanol is an efficient bactericide and when used in the process according to the present invention has the beneficial effect of destroying bacteria and other microorganisms that are present in meat and if not destroyed would develop and cause decomposition of the proteins. Moreover ethyl alcohol when used as herein described unlike other antiseptics and bactericides, leaves no toxic residue in the final product.

Whereas in the practice of the herein described process, ethanol per se may be used, ordinarily it is found satisfactory to use a standard denatured ethyl alcohol 95.2%. Further, in those cases where it may be desirable, as with particularly fatty meat material to subject the material to a vigorous defatting action, it may be found advantageous to employ in addition a supplementary solvent which may be a hydrocarbon liquid such as petroleum ether, or hexane, or a halogenated hydrocarbon such as chloroform or trichlorethylene. The supplementary solvent may be directly mixed with the alcohol solvent and the meat material subjected to the joint action of the combination, or preferably, the supplementary solvent may be employed as such in a separate step subsequent to the dehydration step.

The separation of the spent solvent from the treated material may be effected in known ways, as by settling and decantation, filtration, and centrifugal separation. Thereafter the dehydrated residual meat product may be dried at atmospheric temperatures to remove remaining solvent.

The separated solvent which will have taken up water from the meat material may be recovered for reuse by simple distillation or if desired by azeotropic distillation together with and in the presence of an added hydrocarbon or halogenated hydrocarbon liquid. If fat has been separated from the meat material the same may be recovered in the supernatent layer of the spent solution. Where ethyl alcohol is used, separation of fat is induced by the presence of the dissolved water. If necessary the separation of the fat from the solvent may be brought about by further dilution with water.

In the present process when the water soluble liquid is used to extract water from the meat tissues and a fat-solvent liquid is subsequently employed in removing fat therefrom, some residual alcohol normally will be carried over into the defatting stage, and when the process is continuous the fat solvent will become contaminated. The two solvents thus intermixed, however, may be readily separated. For example, if to the mixture of spent solvents there is added water, an aqueous phase will be formed wherein the alcohol will be preferentially dissolved. It may be recovered by simple boiling to a strength up to 95% alcohol or more.

If the alcohol is commingled with a hydrocarbon liquid such as benzene and the mixture heated to boiling, the vapors will constitute an azeotropic mixture of water, benzene, and some alcohol, and the alcohol left in the still may be reduced to substantially pure alcohol. Dry nitrogen if desired may be used to purge the recovered alcohol. The alcohol thus recovered may be stored or reused immediately. Inasmuch as absolute alcohol or substantially pure alcohol has the capacity to dissolve fats, in the preferred procedure no additional fat solvent is employed. If, however, the use of a specific fat solvent is desired it is necessary to dehydrate the tissues only to the point where the water remaining therein will not be sufficient to interfere with the action of the fat solvent.

Conformably to the present invention, the animal tissue is reduced to a suitable degree of subdivision, conveniently sized pieces, or comminuted by any conventional means such as a grinder, ball mill, colloid mill, or the like. The degree of subdivision may be relatively coarse, and even in fairly large chunks, or quite fine to achieve a large area of contact, and may be carried down to small particles of slurry-like proportions, or even sub-cellular size. The solvent may be added to the animal tissue either before, during or after the subdivision process. In any case the solvent may remain in contact with the material after it has been reduced to desired size for a time sufficient to extract as much water as the solvent will take up. Thereafter the extracted material may be simply permitted to settle from the solvent, or if desired, centrifuged, and filtered. The solvent step may be repeated by resuspension of the meat particles in additional batches of solvent and reseparation of the treated material therefrom.

During the several steps of the process it may become necessary to remove cell membrane material and this may be accomplished if desired by screening or in other conventional manner. The separated collagen can be diverted to processing for purposes of producing gelatin. Fat separated from the meat may be washed with alcohol and clarified in conventional manner. Finally, the dehydrated product may be dried by spray drying, or other conventional means, with or without the addition of supplementary food or flavoring materials. The supernatent layer of spent solvent, after separation from the product, may be boiled to recover the alcohol, or if preferred the spent solvent may be concentrated or hydrolized as with hydrochloric acid, and spray dried to yield a potential flavoring material.

Referring now to the accompanying drawing which consists of a flow sheet diagrammatically illustrating a preferred batch method in accordance with the present invention, A, B and C represent vessels wherein the solvent actions are effected. Each of these vessels is provided with closures $a$, $b$ and $c$ respectively to prevent evaporation of the liquid contents. $M_1$, $M_2$ and $M_3$ indicate a batch of meat material during each of the three stages of processing. $S_1$, $S_2$ and $S_3$ indicate the solvent which is used successively in vessels A, B and C. Spent solvent is transferred from vessel C to distillation, the overhead being returned to supply source 11 and thence to vessel A wherein the meat material $M_3$ undergoes its final extraction. The watery liquids from the distillation step may be discarded or processed if desired to recover certain of their contents. In order to compensate for the comparatively small losses of solvent during the course of the process, fresh solvent may be introduced as needed into supply 11.

In operation as illustrated, meat in a suitable state of subdivision is first introduced into vessel C wherein it is subjected to a relatively mild extraction with partially spent solvent $S_3$. Thereafter the meat is separated from the liquid in vessel C by decantation and filtering, and transferred into vessel B wherein it is subjected to a stronger treatment with extracting solvent $S_2$. Following this, the partially dehydrated meat is transferred into vessel A where it is exposed to the action of the solvent in its most concentrated form. The processed meat is now ready after draining to be dried in a spray drier, at room temperature.

It will be understood from the foregoing that the meat undergoes a counter-current treatment wherein in each stage it is subjected to increasingly effective solutions. In vessel C the partially spent solvent is sufficiently concentrated to remove a portion of the very considerable water in the material, whereas in vessel A, the material which is approaching complete dehydration is subjected to the very strong action of the fresh solvent. During a run using the illustrated method wherein the meat material was fresh ground beef (hamburger) and the solvent, ethanol (SDA-3A), the proportion by volume of solvent to material in each vessel was 3 to 1, and accordingly, during the three stages of treatment the meat was subjected in all to an amount of solvent equal to approximately 9 times the volume of the meat. The meat underwent a marked shrinkage in volume, and was reduced from its original quantity of 400 parts by weight to 138.5 parts by weight as it emerged from the last stage of the process in vessel C. Air drying to remove the remaining solvent from the meat material reduced the meat to 135 parts of its original weight. The total loss of weight is therefore 66 percent of the meat and this represents a loss of water and fat.

The product obtained by the aforesaid process was found to be of palatable taste, and was used, combined with added food components, in meat sauce, and other food combinations.

EXAMPLE 1

*Beef dehydration*

The apparatus included three vessels equipped with closure means to prevent evaporation of alcohol; a stainless steel wire basket 12 of conventional type; and a sieve 13 equipped with means to place the contents under pressure and squeeze out remaining solvent from the treated meat material. A standard denatured alcohol solution was used of 100 parts of 95.2 percent ethyl alcohol.

Starting with fresh ground beef having 70 percent moisture, 14 percent protein, 2.0 percent ash and 14 percent fat in a three stage extraction process, as described above, having one part meat by weight to 5 parts solvent, yielded a product having 5 percent moisture, 50 percent protein, 7 percent ash and 38 percent fat.

It is necessary to leave the meat in contact with the solvent in each stage for a sufficient length of time to allow equilibrium to be established, 4 hours being the minimum length of time for most meat products. 24 hours has proven to be sufficient time in the above example.

EXAMPLE 2

Shrimp dehydration

A supply of individually frozen, peeled and deveined shrimp was obtained and divided into equal portions for treatment with the solvents, ethanol, acetone and n-butanol, respectively.

Each portion of the shrimp material was subjected to a solvent treatment, first with a relatively weak water solution, secondly, with a stronger solution, and finally with "straight" solvent, in each case except the n-butanol, with which latter, the three treatments were carried out with undiluted solvent.

In the case of the ethanol and acetone the first solvent mixture was made up of equal parts of water and solvent, the second treatment with 750 parts of solvent mixed with 250 parts of water, and the third treatment with the substantially undiluted solvent. The starting material was 250 parts of shrimp material which was put in a vessel with 1,000 parts of the solvent or solvent mixture in each instance. The loss in volume of the liquids by admixture was not taken into consideration.

The shrimp material was permitted to remain successively in each solution for a period of time sufficient (4 to 24 hours) to permit the solvent to extract the maximum amount of water, and thereafter removed and drained. At the final stage the weight of the shrimp had been reduced to 165.5 parts as compared with its original 250 parts. The drained shrimp after weighing was placed in an oven and therein dried in a current of warm air. The solvent used during the final treatment was found to have extracted 45 parts by weight of the water present in the shrimp already partially dehydrated.

The ethanol treated shrimp originally 250 parts by weight over the same period of time, after draining showed a reduction to 170 parts by weight. Following weighing, this shrimp material was also put in the air drier together with the ethanol treated shrimp.

The acetone treated shrimp had a drained weight before oven desiccation, of 155.5 parts, and the n-butanol extracted shrimp 80.9 parts by weight, in each case down from the original 250 parts. The final product lost 32 percent and 38 percent respectively.

All of the aforesaid drained shrimp material was warmed in the oven to a temperature of 95 to 100° F. in a current of air.

By far the better appearing of the products of the aforesaid treatments were the ethanol extracted shrimp. The ethanol treatment gave a product that especially well retained practically all of the normal color stripes of the shrimp. The product of the acetone treatment, had taken on a yellowish cast. The n-butanol treated shrimp showed some darkening and a generally unappetizing appearance.

The air drying of the shrimp was continued until the products were entirely desiccated, and the products were then sealed in polyethylene bags, with the exception of small samples which were retained for rehydration. The latter were soaked in tap water for three hours at room temperature. Other portions of the dehydrated shrimp were boiled. In appearance and taste the thus reconstituted products of the ethanol treatments were definitely superior to that of the acetone and n-butanol treated shrimp.

From the foregoing and related experimental work, it has been determined that whereas shrimp may be dehydrated with any of the foregoing solvents, the appearance of the ethanol treated shrimp is quite acceptable for food purposes, but the acetone and n-butanol treatments yield discolored products unsatisfactory for consumer appeal. The odor and taste of the ethanol product was satisfactory, but the acetone and n-butanol products exhibited an off odor and flavor unacceptable in a food product for human consumption.

EXAMPLE 3

Pork dehydration

Fresh pork tissue was cut into pieces approximately 1 inch square and ½ inch thick, placed in a vessel with special denatured ethyl alcohol (formula SDA–3A), and permitted to stand for a period of time sufficient to dissolve substantially as much water as the solvent would take up. The liquid was then drained off and the extracted material treated successively with fresh alcohol. It was found by this treatment that the lean tissue was very considerably reduced in volume, whereas the effect on the fat was comparatively small.

By cutting away from the material initially, the majority of its visible fat a pork product was obtained which was suitable for use in preparing various cooked dishes.

With regard to the time for treating the samples in a three stage extraction process equilibrium is reached in 4 to 24 hours, satisfactory results having been obtained at the end of four hours.

The dehydrated samples absorbed water so as to be reconstituted taking up approximately 90 percent of the water removed and hold this water so as to give a product that is edible and may be used in the place of fresh meat.

For example 1 pound of dehydrated products from which 13 pounds of water have been removed can be soaked in water to restore the original approximate four pound weight.

It has been found that a final moisture content of 6 percent to 12 percent of the protein content of the final product will keep quite well without refrigeration for several weeks. For indefinite longer storage the moisture content should be reduced to approximately 2 percent.

It will be clear that the foregoing process can be carried out in numerous ways and with many variations without departing from the essential features of the invention.

While in the above examples a batch process has been described, the process may be made continuous and the solvent may be pumped from one vessel to another and the meat product may also be moved as a slurry. Therefore in the appended claims a process is claimed, which process may either be a batch process or a continuous process.

What is claimed is:

1. A process for dehydrating meat, comprising:
   (a) commingling fresh comminuted meat at room temperature with a first portion of a non-toxic water solvent liquid from Step (b), permitting said meat and said liquid to remain in contact for a period of time of 4 to 24 hours, whereby equilibrium is established between said solvent and said meat, separating the partially dehydrated meat from said liquid;
   (b) thereafter commingling said partially dehydrated meat with a second portion of the non-toxic water solvent liquid of greater concentration from Step (c), permitting said partially dehydrated meat and said second portion of liquid to remain in contact for a period of time of 4 to 24 hours, whereby equilibrium is established between said solvent and said meat, separating the partially dehydrated meat from said liquid;
   (c) thereafter commingling said partially dehydrated meat with a third portion at least three times the volume of said meat of the non-toxic water solvent liquid of still greater concentration, about 95%, permitting said partially dehydrated meat and said third portion of liquid to remain in contact for a period of time of 4 to 24 hours, whereby equilibrium is established between said liquid and said meat, removing said meat from said liquid;

(d) and removing traces of said liquid from said meat, said resulting dehydrated meat product having a final water content of 2 to 12 percent.

2. A process for dehydrating meat, comprising:

(a) commingling fresh comminuted meat at room temperature with a first portion of a non-toxic alcohol from Step (b), permitting said meat and said alcohol to remain in contact for a period of time, at least 4 hours, whereby equilibrium is established between said alcohol and said meat, separating the partially dehydrated meat from said alcohol;

(b) thereafter commingling said partially dehydrated meat with a second portion of the non-toxic alcohol of greater concentration from Step (c), permitting said partially dehydrated meat and said second portion of alcohol to remain in contact for a period of time of at least 4 hours, whereby equilibrium is established between said alcohol and said meat, separating the partially dehydrated meat from said alcohol;

(c) thereafter commingling said partially dehydrated meat with a third portion at least three times the volume of said meat in Step (a) of the non-toxic alcohol of still greater concentration, of approximately 95%, permitting said partially dehydrated meat and said third portion of alcohol to remain in contact for a period of time of at least 4 hours, whereby equilibrium is established between said alcohol and said meat, removing said meat from said alcohol;

(d) and removing traces of said alcohol from said meat, said resulting dehydrated meat product having a final water content of 2 to 12 percent.

3. A process for dehydrating and defatting meat comprising:

(a) commingling fresh comminuted meat at room temperature with a first portion of non-toxic water solvent and fat solvent liquid from Step (b), permitting said meat and said liquid to remain in contact for a period of time of 4 to 24 hours, whereby equilibrium is established between said solvent and said meat, separating the partially dehydrated meat from said liquid;

(b) thereafter commingling said partially dehydrated meat with a second portion of the non-toxic water and fat solvent liquid of greater concentration from Step (c), permitting said partially dehydrated meat and said second portion of liquid to remain in contact for a period of time of 4 to 24 hours, whereby equilibrium is established between said solvent and said meat, separating the partially dehydrated meat from said liquid;

(c) thereafter commingling said partially dehydrated mean with a a third portion, at least three times the volume of said meat in Step (a), of the non-toxic water and fat solvent liquid of still greater concentration, about 95%, permitting said partially dehydrated meat and said third portion of liquid to remain in contact for a period of time of 4 to 24 hours whereby equilibrium is established between said liquid and said meat, removing said meat from said liquid;

(d) and removing traces of said liquid from said meat, said resulting dehydrated meat product having a final water content of 2 to 12 percent.

References Cited by the Examiner

UNITED STATES PATENTS

| | | | |
|---|---|---|---|
| 1,934,677 | 11/33 | Ash | 99—209 X |
| 2,358,869 | 9/44 | Maurer et al. | |
| 2,503,312 | 4/50 | Worsham et al. | 99—208 |
| 2,539,544 | 1/51 | Levin et al. | 99—208 |
| 2,619,425 | 11/52 | Levin | 99—209 X |
| 2,813,027 | 11/57 | Galliver et al. | |
| 2,972,542 | 2/61 | Levin | 99—209 |

OTHER REFERENCES

A. and E. Rose: "The Condensed Chemical Dictionary," fifth ed., 1956, published by Reinhold Publishing Corp., New York, page 706, article entitled "Methanol."

A. LOUIS MONACELL, *Primary Examiner.*

HYMAN LORD, *Examiner.*